United States Patent [19]
Rugh

[11] Patent Number: 6,032,550
[45] Date of Patent: Mar. 7, 2000

[54] RIGHT ANGLE DRIVE GEARBOX

[75] Inventor: William B. Rugh, Waterville, Ohio

[73] Assignee: Owens-Brockway Glass Container Inc., Toledo, Ohio

[21] Appl. No.: 09/148,878

[22] Filed: Sep. 8, 1998

[51] Int. Cl.[7] .............................. F16H 1/16; F16H 57/02
[52] U.S. Cl. .......................................... 74/425; 74/606 R
[58] Field of Search ................................... 74/89.14, 425, 74/606 R

[56] References Cited

U.S. PATENT DOCUMENTS

| | | |
|---|---|---|
| 2,688,881 | 9/1954 | Crossland . |
| 3,319,482 | 5/1967 | Campbell et al. ......................... 74/425 |
| 3,490,307 | 1/1970 | Jetter ........................................ 74/425 |
| 3,788,158 | 1/1974 | Firth . |
| 4,020,715 | 5/1977 | Sollars .................................. 74/606 R |
| 4,147,072 | 4/1979 | Mullins . |
| 4,930,367 | 6/1990 | Nagasawa . |
| 5,044,488 | 9/1991 | Bolin . |
| 5,222,402 | 6/1993 | White et al. ........................... 74/89.14 |

*Primary Examiner*—Allan D. Herrmann

[57] ABSTRACT

A right angle drive gearbox (10) having a housing (12) defined by a pair of housing members (14, 16). The housing has a first opposed pair of cylindrical openings that are formed by opposed semi-cylindrical recesses (42, 46) in opposed side walls of one of the housing members and a second opposed pair of cylindrical openings that are formed by opposed semi-cylindrical recesses (44, 48) in opposed side walls of the other of the housing members. A first shaft (24) is rotatingly supported in the first opposed pair of cylindrical openings, and a second shaft (20) is rotatingly supported in the second opposed pair of cylindrical openings, the longitudinal central axes of the first and second shafts being spaced apart from one another and otherwise extending perpendicularly with respect to one another. A first gear (22) is affixed to the first shaft, at a location between the first pair of cylindrical openings, and a second gear (18) is affixed to the second shaft at a location between the second pair of cylindrical openings, the first and second gears drivingly engaging one another. A pair of threaded fasteners (50, 52) extend through one of the housing members to be threadably received in the other of the housing members to releasably join the housing members to one another.

2 Claims, 2 Drawing Sheets

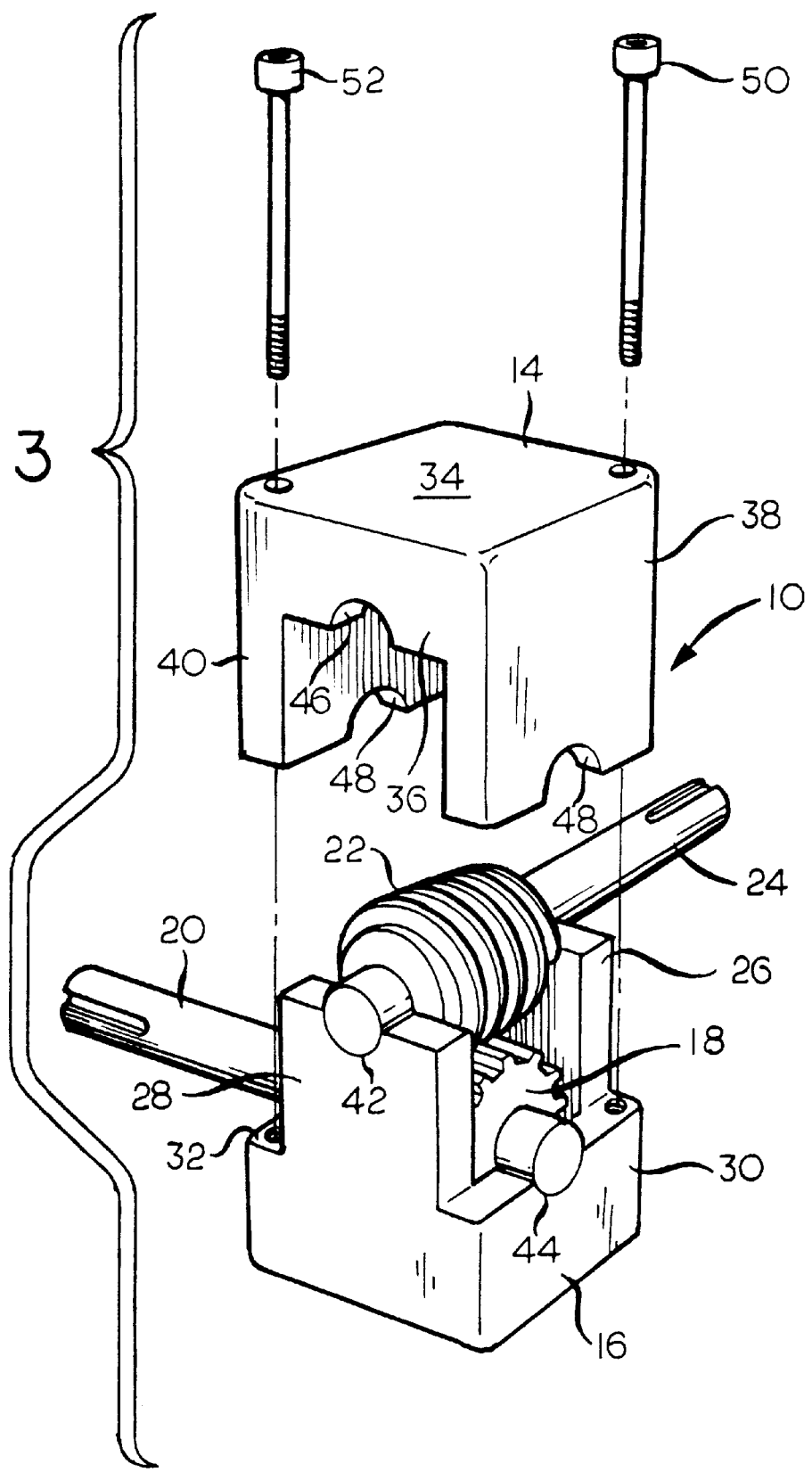

RIGHT ANGLE DRIVE GEARBOX

FIELD OF THE INVENTION

This invention relates to a gearbox for transmitting motion from a first shaft to a second shaft, the second shaft being spaced from the first shaft and otherwise extending perpendicularly to the first shaft. More particularly, this invention relates to a gearbox of the foregoing character that is intended to be used only intermittently and only to transmit low levels of torque from the first shaft to the second shaft.

BACKGROUND OF THE INVENTION

U.S. patent application Ser. No. 08/854,042, which is assigned to the assignee of this application, describes an article transfer device, which is usually referred to as a lehr loader or a stacker, that is intended to transfer a plurality of freshly formed glass containers, in a linear array, and in unison, transversely of a conveyor carrying the containers into a heat treating device, which is usually called an annealing lehr. U.S. Pat. No. 5,044,488 (Bolin), the disclosure of which is incorporated by reference herein, describes an alternative version of a lehr loader or stacker and describes the required three-axis motion that a pusher bar of the lehr loader or stacker must undergo during each container transfer cycle.

A glass container lehr loader of the type described is serviced by an infeed conveyor, usually called a cross-conveyor, whose upper, conveying flight must be carefully positioned in elevation to be able to present the container for proper transfer to a conveyor of the lehr by the lehr loader. This requirement may be met by providing the cross conveyor with a plurality of right angle drive gearboxes, many of which are positioned at relatively inaccessible locations, and in any case in a relatively high temperature environment due to the proximity of the cross-conveyor to the lehr and the latent heat of the containers at the inlet to the lehr. These right angle drive gearboxes need only be used intermittently, however, prior to a change in the position of the elevation of the cross-conveyor at one or more locations, and they are only used to transfer fairly low levels of torque, typically being manufally operated. Hence, these right angle drive gearboxes need not be massive or rugged, and a fairly simple and relatively inexpensive gearbox is usually more than adequate for this service. However, it is important that such a gearbox be easy to take apart for maintenance and lubrication and that it be closed during operation to keep dust and foreign particles out of the gears, and to keep lubricant in contact therewith.

BRIEF DESCRIPTION OF THE INVENTION

According to the present invention there is provided an enclosed right angle drive gearbox that is suitable for intermittent use to transmit low levels of torque. The gearbox of the present invention comprises upper and lower housing members that are disengageably secured to one another to define a space, and first and second shafts, each of which has a gear that is keyed or otherwise affixed thereto and positioned within the space defined by the upper and lower housing members. The first and second shafts are spaced apart from one another and the gears carried by the first and second shafts drivingly engage one another at a location within the space defined by the upper and lower housing members. As the first and second shafts rotate only intermittently, the housing need not be provided with separate bearings or bushings to accommodate the rotation of the shafts, it being sufficient that the upper and lower housing members each be provided with complementary semi-cylindrical recesses to form cylindrical openings that rotatingly engage the first and second shafts.

Accordingly, it is an object of the present invention to provide a simple, relatively inexpensive, enclosed right angle drive gearbox for transmitting motion from a first shaft to a second shaft that is spaced from the second shaft and otherwise extends generally perpendicularly with respect thereto. It is a further object of the present invention to provide a gearbox of the foregoing character that does not require separate bearings or bushings to accommodate the turning motions of the first and second shafts.

BRIEF DESCRIPTION OF THE DRAWING

FIG. 3 is an exploded perspective view, at the scale of FIG. 2, of the gearbox of FIGS. 1 and 2.

DETAILED DESCRIPTION OF THE PREFERRED EMBODIMENT

Figure 1:
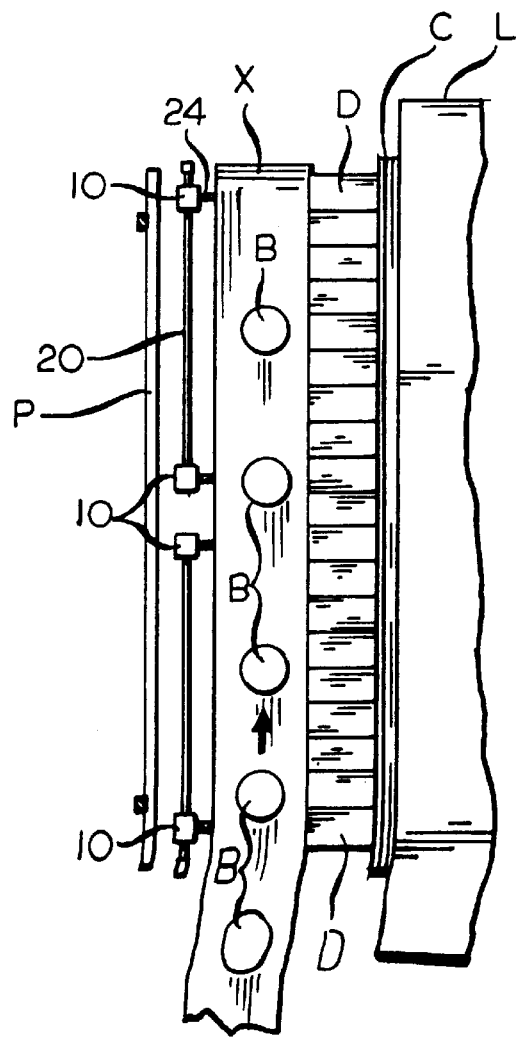
FIG. 1 is a fragmentary plan view of a glass container lehr loader and lehr combination in which a cross-conveyor positioned between the lehr loader and the lehr is provided with a plurality of right angle drive gearboxes according to a preferred embodiment of the present invention.

FIG. 1 illustrates a glass container annealing lehr installation in which an annealing lehr L has a conveyor C, for example, an endless wire mesh conveyor, for conveying freshly formed glass containers B on a cross-conveyor X through the lehr L to relief residual forming stresses in the containers B. The containers B are transferred in unison from the cross-conveyor X to the conveyor C by a pusher bar P of a three-axis lehr loader or stacker, which may be of conventional construction, the containers B passing across a series of deadplates D on their way from the conveyor X to the conveyor C. From time to time it is necessary or desirable to be able to adjust the elevation of an upper flight of the conveyor X, for example, to be able to align the level of the conveyor X with the level of the upper flight of the conveyor C, and to that end a plurality of manually operated adjustment mechanisms, each involving a right angle drive gearbox 10, are provided.

Figure 2:
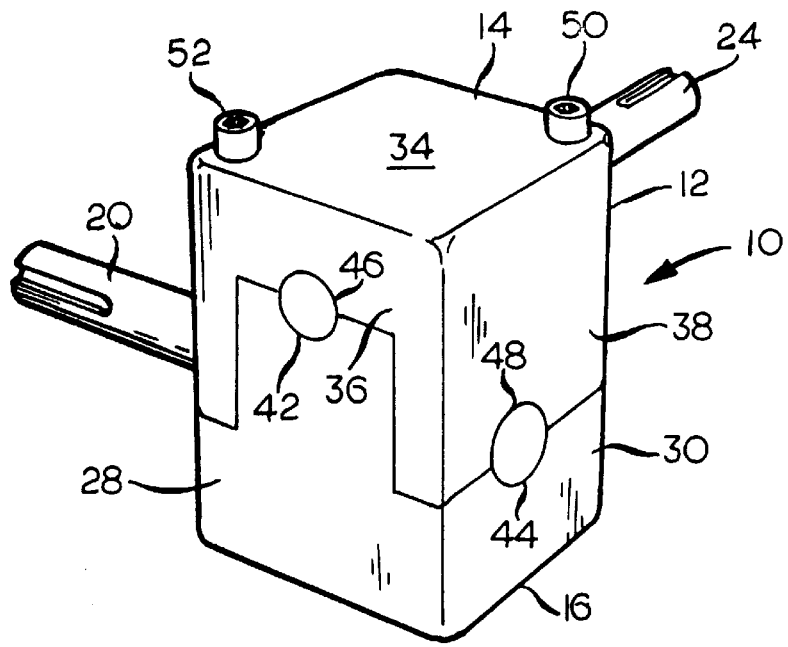
FIG. 2 is a perspective view at an enlarged scale of a gearbox of the type shown in FIG. 1.

As is shown in FIG. 2, a gearbox 10 has a housing 12 in the shape of a parallelepiped, and the housing 12 is made up of upper and lower housing members 14, 16. The housing 12, which has an internal cavity or space, encloses a driving gear 18, which is keyed or otherwise affixed to a driving shaft 20, and a driven gear 22, which is keyed or otherwise affixed to a driven shaft 24 and is drivingly engaged by the driving gear 18. The longitudinal central axis of the driven shaft 24 is spaced from the longitudinal central axis of the driving shaft 20, and otherwise extends perpendicularly with respect thereto.

The lower housing member 16 has a bottom wall, not shown, a first opposed, spaced apart like pair of upstanding side walls 26, 28, and a second opposed, spaced apart like pair of upstanding side walls 30, 32, the first side walls 26, 28 extending a substantially greater distance from the bottom wall of the lower housing member 16 than the second side walls 30, 32. Similarly, the upper housing member 14 has a top wall 34, a first opposed, spaced apart like pair of side walls, only one of which, the side wall 36, is shown, and a second opposed, spaced apart like pair of side walls 38, 40, the second side walls 38, 40 extending a substantially greater distance from the top wall 34 than the first side wall 36.

Each of the first side walls 26, 28 of the lower housing member 16 has a semi-cylindrical recess 42 in a free edge thereof, and each of the second side walls of the lower housing member 16, including the side wall 30, has a semi-cylindrical recess 44 in a free edge thereof. Likewise, each of the first side walls of the upper housing member 14, including the side wall 36, has a semi-cylindrical recess 46 in a free edge thereof, and each of the second side walls 38, 40 of the upper housing member 14 has a semi-cylindrical recess 48 in a free edge thereof Thus, when the housing members 14, 16 are removable joined together, threaded fasteners 50, 52 being provided to serve that purpose, the opposed recesses 42 of the lower housing member 16 are positioned complementarily to the opposed recesses 46 of the upper housing member 14 to form cylindrical openings for rotatingly supporting the driven shaft 24, at locations on opposite sides of the driven gear 22. Likewise, when housing members 14, 16 are joined together, the opposed recesses 44 of the lower housing member 14 are positioned complementarily to the opposed recesses 48 of the upper housing member 14 to form cylindrical openings for rotatingly supporting the driving shaft 20 on opposite sides of the driving gear 18. In that regard, because the gearbox 10 is intended to be operated only intermittently and only under low levels of torque at that, the cylindrical openings defined by the recesses 42, 46 and 44, 48 need not be provided with separate bearings or bushings, and this eliminates elements that would otherwise materially increase the cost of the gearbox 10.

It is also to be noted that the upper housing member 14 can be readily removed from the lower housing member 16, to inspect or replace the gears 18, 22 or to repair the housing 12, for example, and this can be done simply by the removal of the threaded fasteners 50, 52, as heretofore described. Thus, the gearbox 10 is not only relatively inexpensive, because it does not have and does not require separate bearings or bushings to rotatingly support the shafts 20, 24, as heretofore described, but it is also quite simple to disassemble for purposes of repair or replacement of any of its constituent elements that are subject to wear or damage in operation In fact, the fact that separate bushings or bearings are not used facilitates the disassembly of the housing 12. Also, the fact that the gearbox 10 totally encloses the gears 18, 22, as it must to ensure that the recesses 42, 46 and 44, 48 are positioned complementarily to define cylindrical openings, as heretofore described, ensures that dirt and other foreign particles can be kept out of contaminating engagement with the gears 18, 22, and that a suitable lubricant, such as a viscous grease, can be kept in engagement with them.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed is:

1. An enclosed, right angle drive gearbox for use in adjusting elevation of an infeed conveyor of a glass annealing lehr, said gearbox comprising:

a first housing member having an end wall, a first spaced apart opposed pair of side walls extending from said end wall and a second spaced apart opposed pair of side walls extending from said end wall, said second spaced apart pair of side walls being positioned between and extending transversely of the side walls of said first spaced apart pair of side walls, the side walls of one of said first spaced apart pair of side walls and said second spaced apart pair of side walls extending substantially further from said end wall than the side walls of the other of said first spaced apart pair of side walls and said second spaced apart pair of side walls, each of the side walls of each of said first spaced apart pair of side walls and said second spaced apart pair of side walls having a semi-cylindrical recess in a free edge thereof;

a second housing member having an end wall, a first spaced apart opposed pair of side walls extending from said end wall of said second housing member and a second spaced apart pair of side walls extending from said end wall of said second housing member, said second spaced apart pair of side walls of said second housing member being positioned between and extending transversely of the side walls of said first spaced apart pair of side walls of said second housing member, the side walls of one of said first spaced apart pair of side walls of said second housing member and said second spaced apart pair of side walls of said second housing member extending substantially further from said end wall of said second housing member than the side walls of the other of said first spaced apart pair of side walls of said second housing member and said second spaced apart pair of side walls of said second housing member, each of the side walls of each of said first spaced apart pair of side walls and said second spaced apart pair of side walls of said second housing member having a semi-cylindrical recess in a free edge thereof;

means for disengageably securing said first housing member and said second housing member to one another with a first pair of cylindrical opening defined by the semi-cylindrical recesses of one of said first pair of side walls of said first housing member and the semi-cylindrical recesses of one of said first pair of side walls of said second housing member and a second pair of cylindrical openings defined by the semi-cylindrical recesses of said second pair of side walls of said first housing member and the semi-cylindrical recesses of said second pair of side walls of said second housing member;

a first shaft rotatingly supported in one of said first pair of cylindrical openings and said second pair of cylindrical openings;

a second shaft rotatingly supported in the other of said first pair of cylindrical openings and said second pair of cylindrical openings;

a first gear affixed to said first shaft between said one of said first pair of cylindrical openings and said second pair of cylindrical openings; and a second gear affixed to said second shaft between said other of said first pair of cylindrical openings and said second pair of cylindrical openings, said first gear and said second gear drivingly engaging one another;

wherein each of said first pair of cylindrical openings and said second pair of cylindrical openings has no separate bearing or bushing therein.

2. A gearbox according to claim 1 wherein said means for disengageably securing comprises a spaced apart plurality of threaded fasteners passing through one of said first housing member and said second housing member and being threadably received in the other of said first housing member and said second housing member.

* * * * *